United States Patent
Tazzari et al.

(10) Patent No.: US 10,616,779 B2
(45) Date of Patent: Apr. 7, 2020

(54) WIRELESS COMMUNICATION NETWORK

(71) Applicant: ABB Schweiz AG, Baden (CH)

(72) Inventors: Davide Tazzari, Loro Ciuffenna (IT);
Filippo Vernia, La Spezia (IT);
Francesca Mazziotti, Montevarchi (IT);
Luigi Lamoglie, Terranuova Bracciolini (IT)

(73) Assignee: ABB Schweiz AG, Baden (CH)

( * ) Notice: Subject to any disclaimer, the term of this patent is extended or adjusted under 35 U.S.C. 154(b) by 24 days.

(21) Appl. No.: 15/877,504

(22) Filed: Jan. 23, 2018

(65) Prior Publication Data

US 2018/0213416 A1    Jul. 26, 2018

(30) Foreign Application Priority Data

Jan. 24, 2017   (EP) .................... 17152792

(51) Int. Cl.
| | | |
|---|---|---|
| *H04W 24/02* | (2009.01) | |
| *H04W 16/24* | (2009.01) | |
| *H04W 8/00* | (2009.01) | |
| *H04W 4/38* | (2018.01) | |
| *H04W 84/20* | (2009.01) | |
| *H04W 88/06* | (2009.01) | |
| *H04W 84/18* | (2009.01) | |
| *H04W 24/04* | (2009.01) | |

(52) U.S. Cl.
CPC ............. *H04W 24/02* (2013.01); *H04W 4/38* (2018.02); *H04W 8/005* (2013.01); *H04W 16/24* (2013.01); *H04W 84/20* (2013.01); *H04W 24/04* (2013.01); *H04W 84/18* (2013.01); *H04W 88/06* (2013.01)

(58) Field of Classification Search
CPC ..... H04W 24/02; H04W 16/24; H04W 84/18; H04W 12/06; H04W 12/08; H04W 76/14
See application file for complete search history.

(56) References Cited

U.S. PATENT DOCUMENTS

| | | | |
|---|---|---|---|
| 6,590,928 | B1 | 7/2003 | Haartsen |
| 7,505,450 | B2 | 3/2009 | Castagnoli |
| 10,104,597 | B2* | 10/2018 | Ge .................... H04W 48/16 |
| 2016/0142252 | A1* | 5/2016 | Garg ................ H04L 41/0806 |
| | | | 455/424 |
| 2016/0353497 | A1 | 12/2016 | Oakes |
| 2017/0288599 | A1* | 10/2017 | Chapman ............... H02S 10/00 |

FOREIGN PATENT DOCUMENTS

| | | |
|---|---|---|
| EP | 2239992 A2 | 10/2010 |
| EP | 2779751 A2 | 9/2014 |

* cited by examiner

*Primary Examiner* — Shukri Taha
(74) *Attorney, Agent, or Firm* — Patterson Intellectual Property Law, P.C.; Gary L. Montle

(57) ABSTRACT

A network (1) is described. The network comprises a plurality of electronic devices (9) in data communication relationship with a data collection unit (4) having a wireless network access point. Moreover:
  each electronic device (9) comprises a wireless communication unit (13; 13.*j*) featuring a station mode function (SM) and an access-point mode function (APM);
  each electronic device (9) of a first set of electronic devices is directly linked, through the station mode function (SM) of the respective wireless communication unit (13), to the wireless network access point of the data collection unit (4).

5 Claims, 18 Drawing Sheets

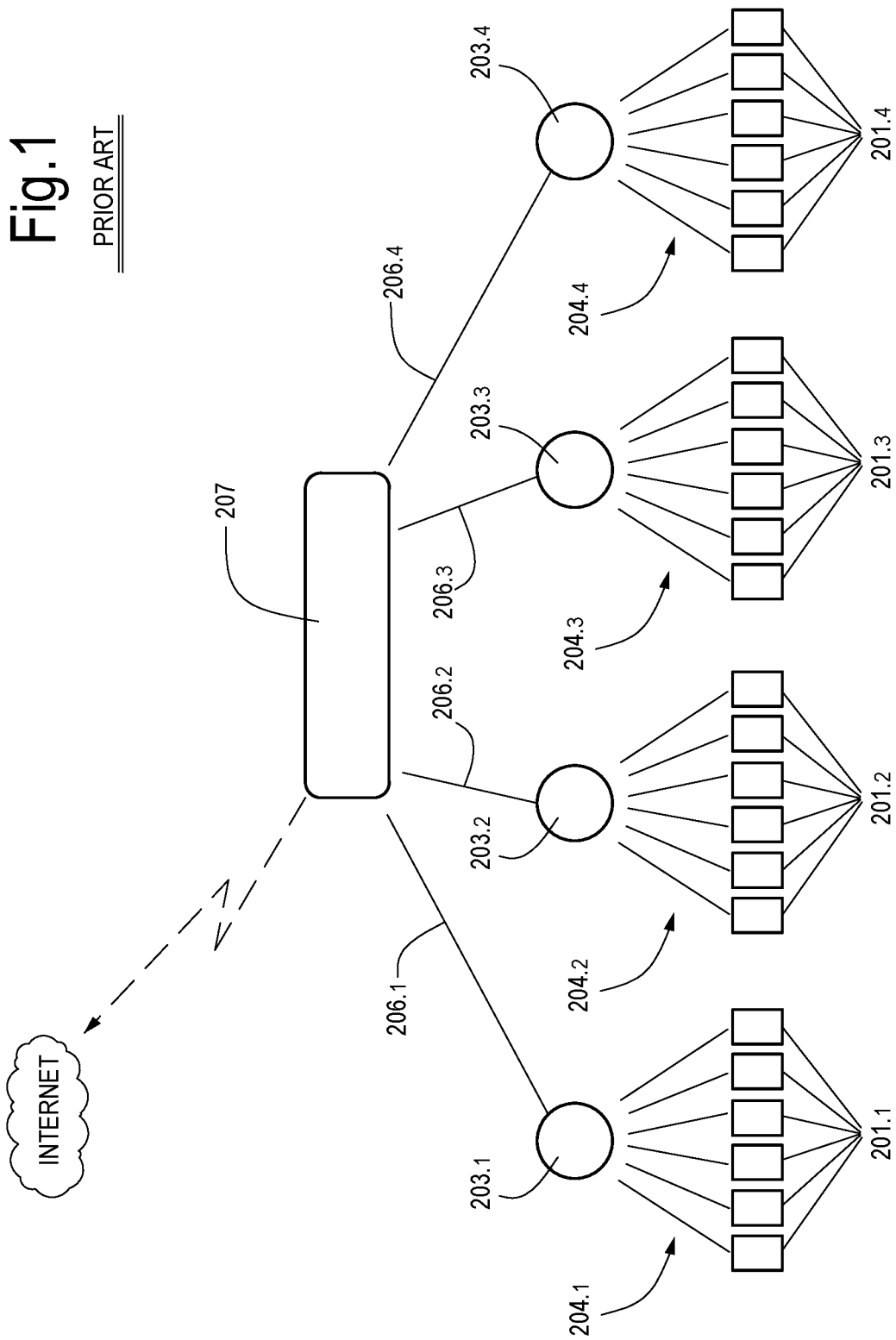

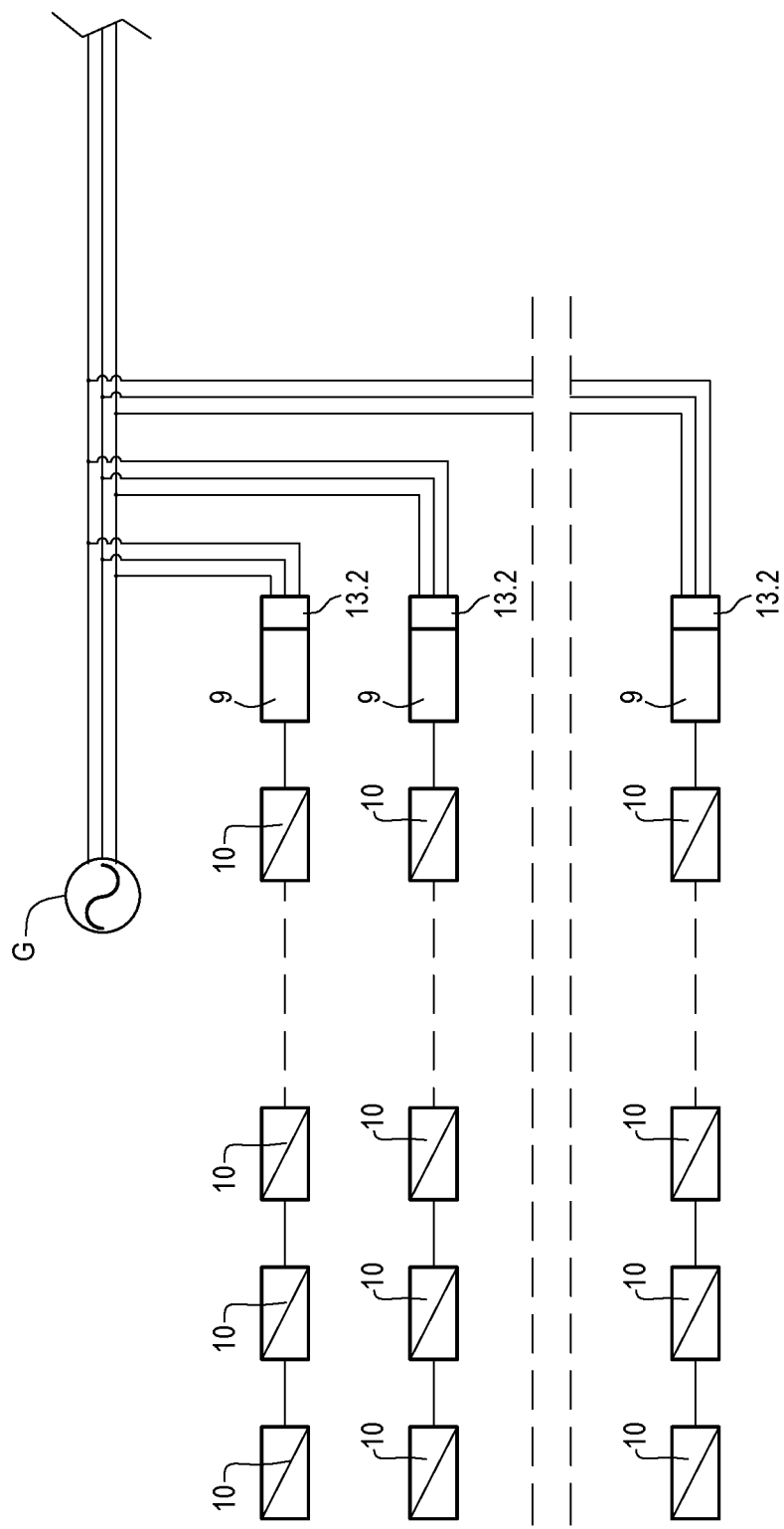

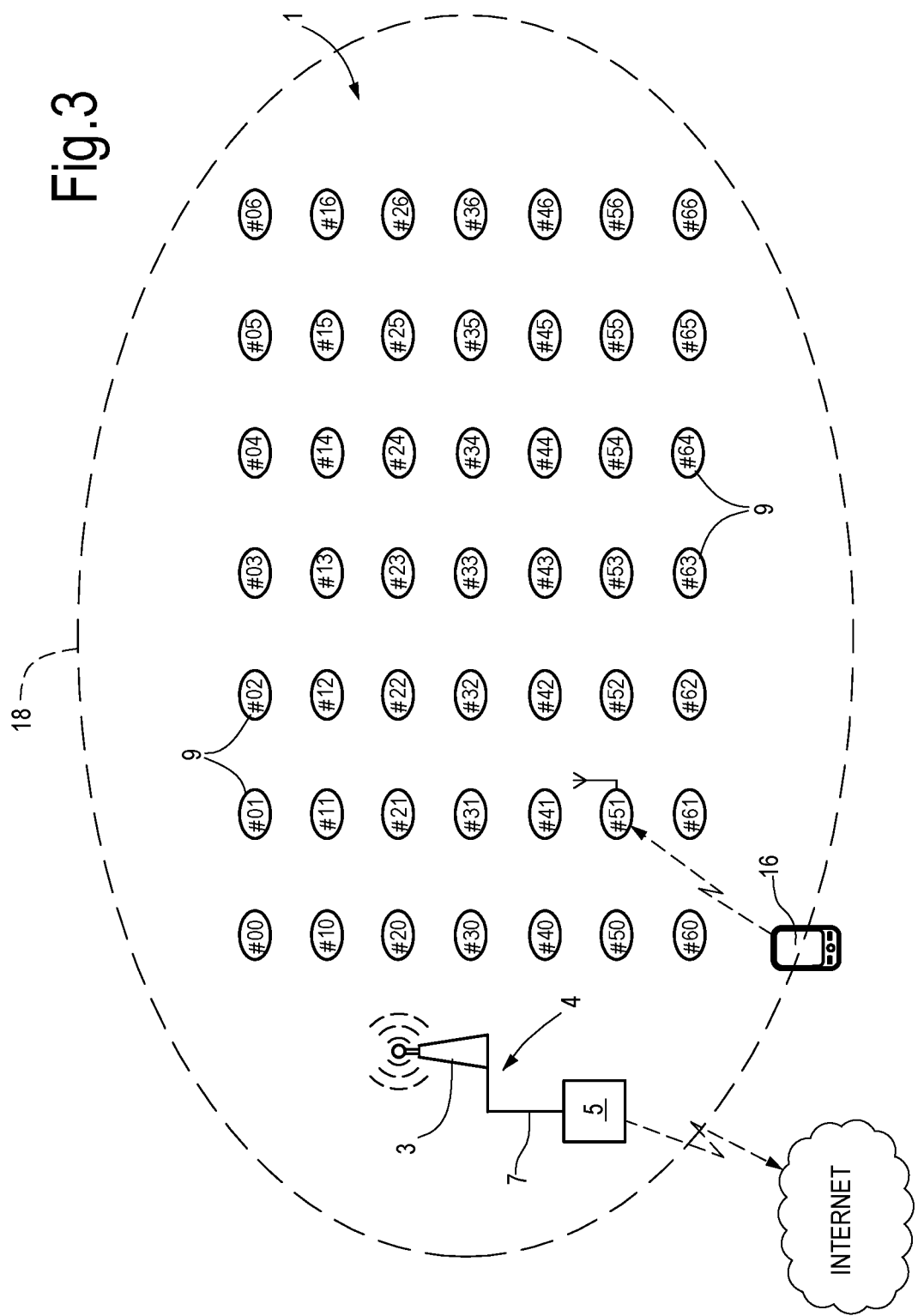

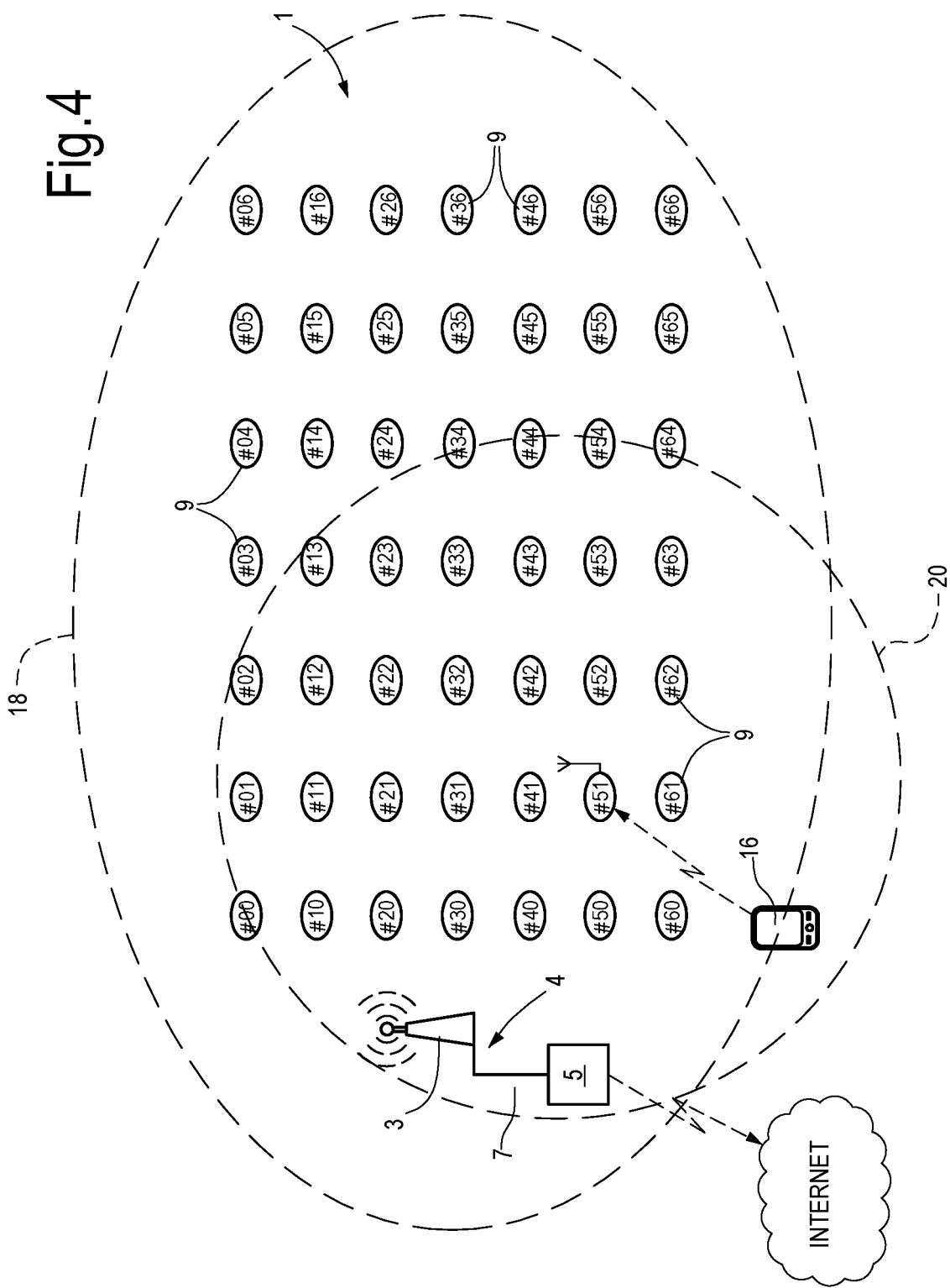

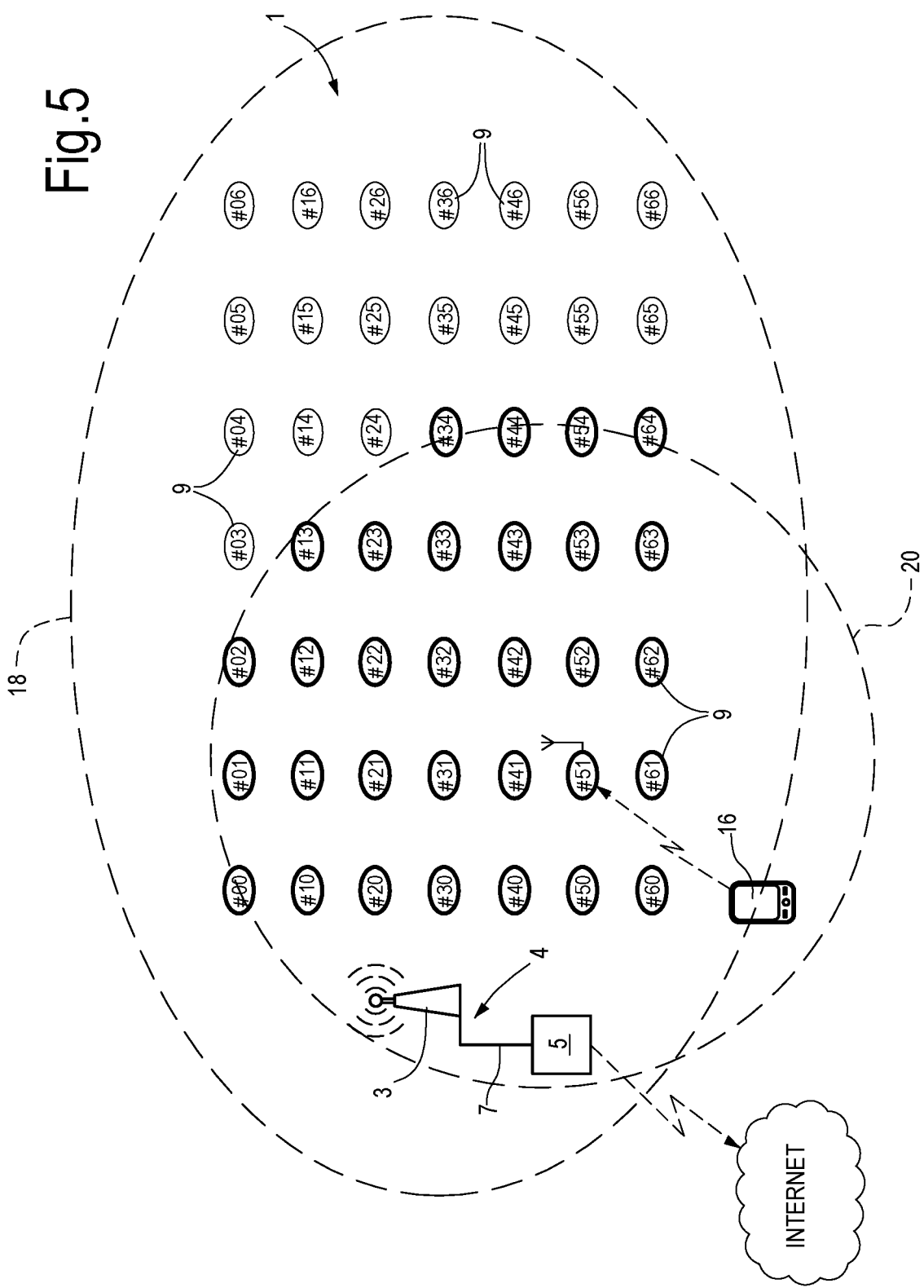

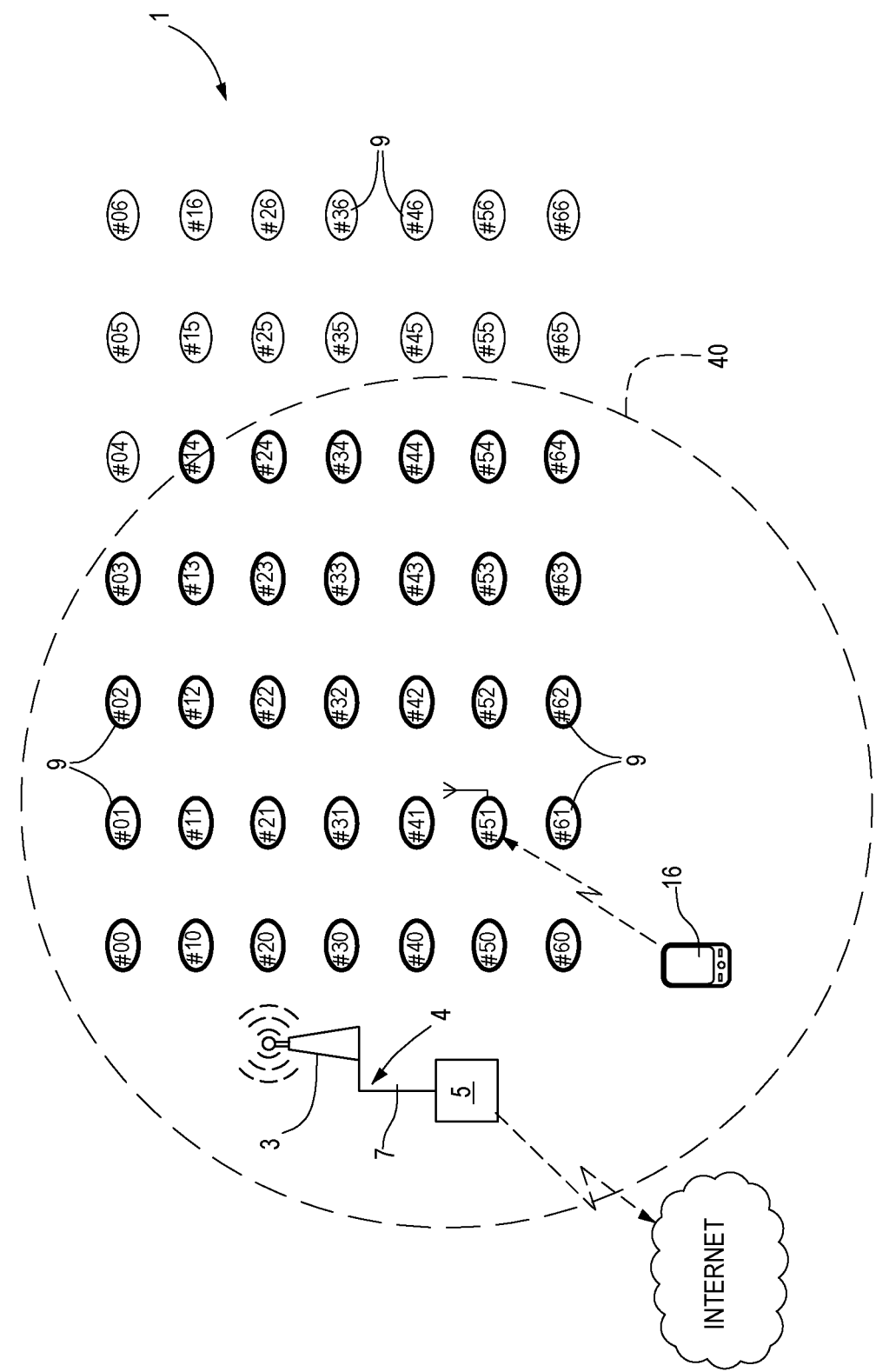

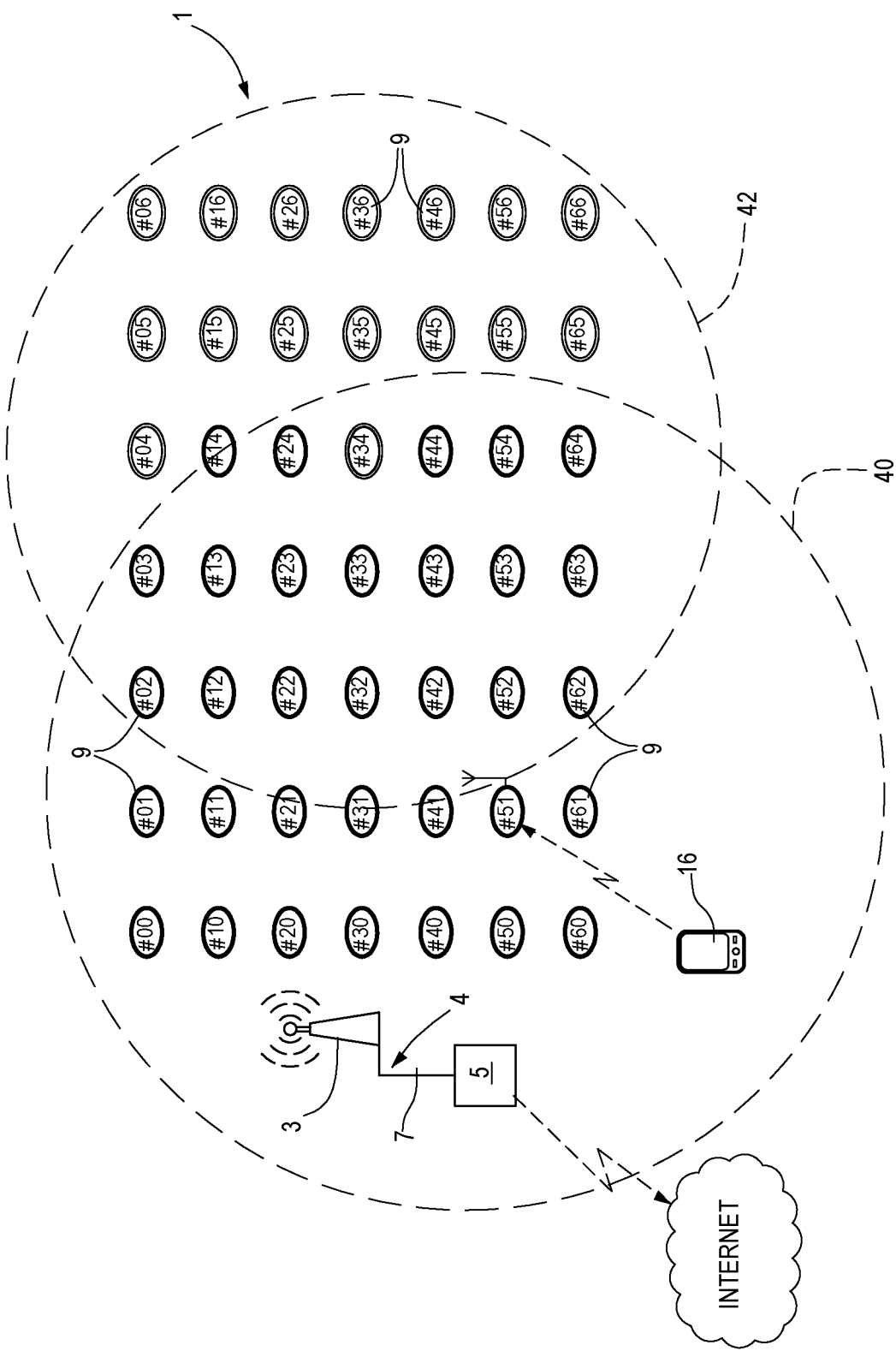

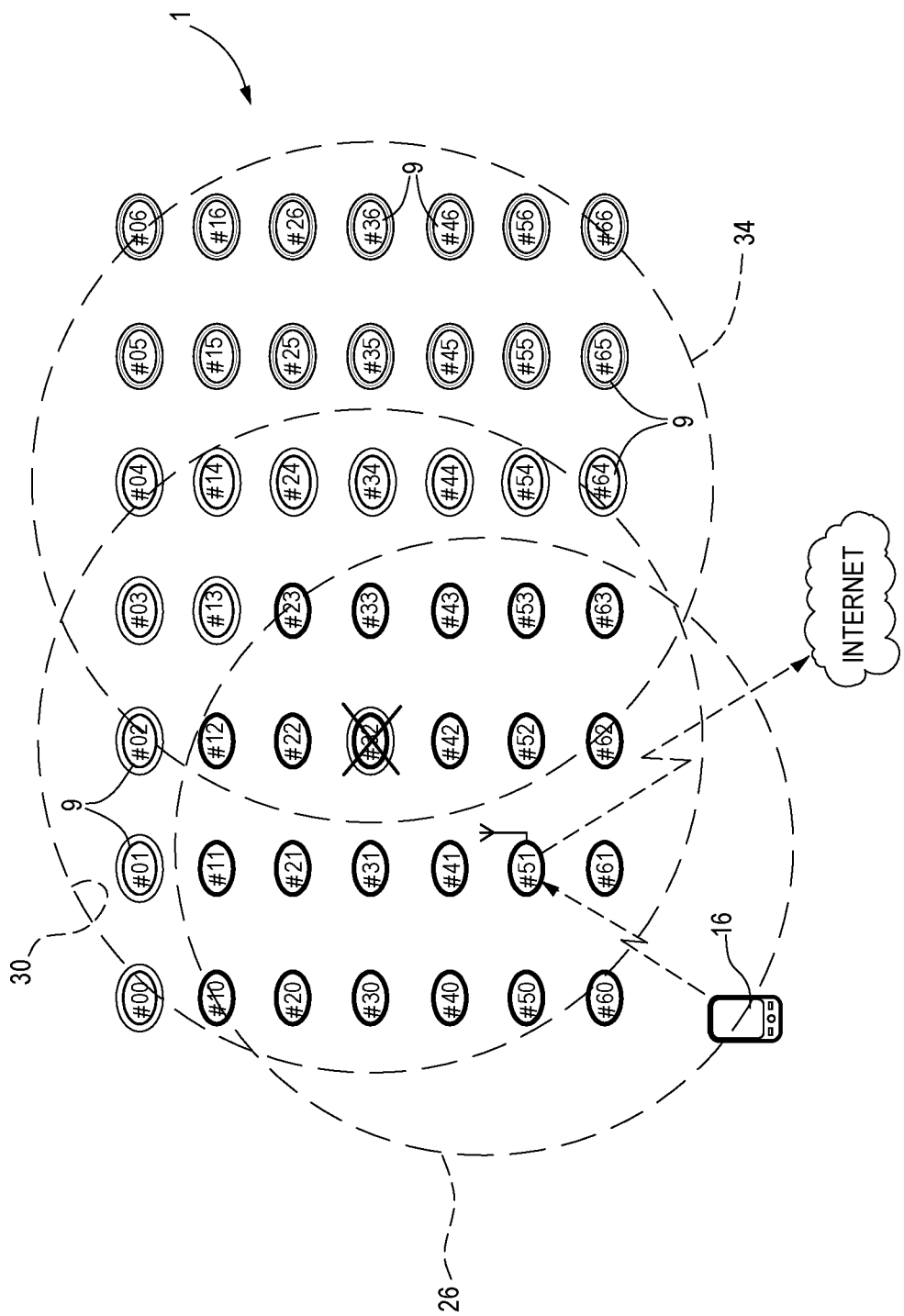

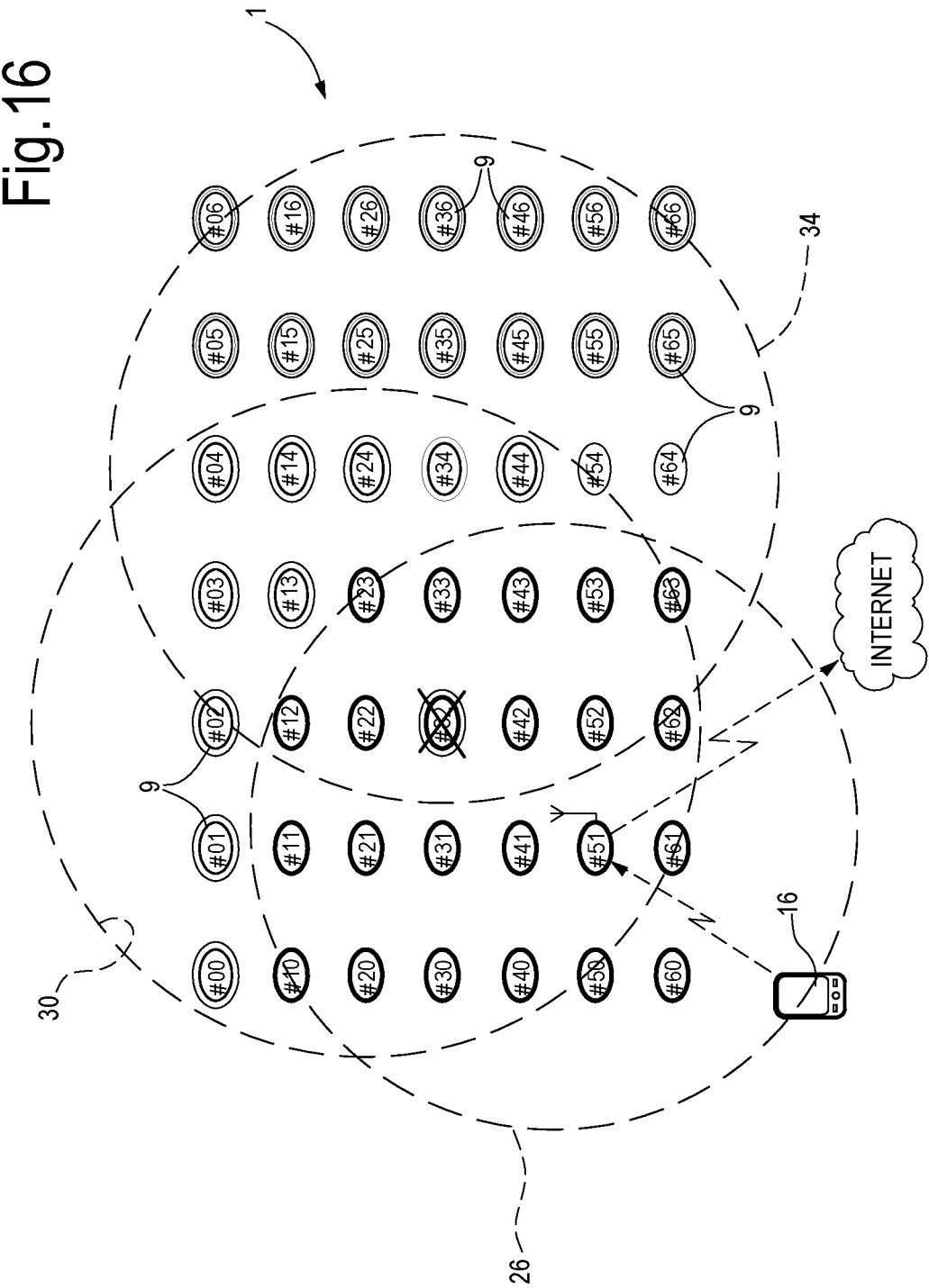

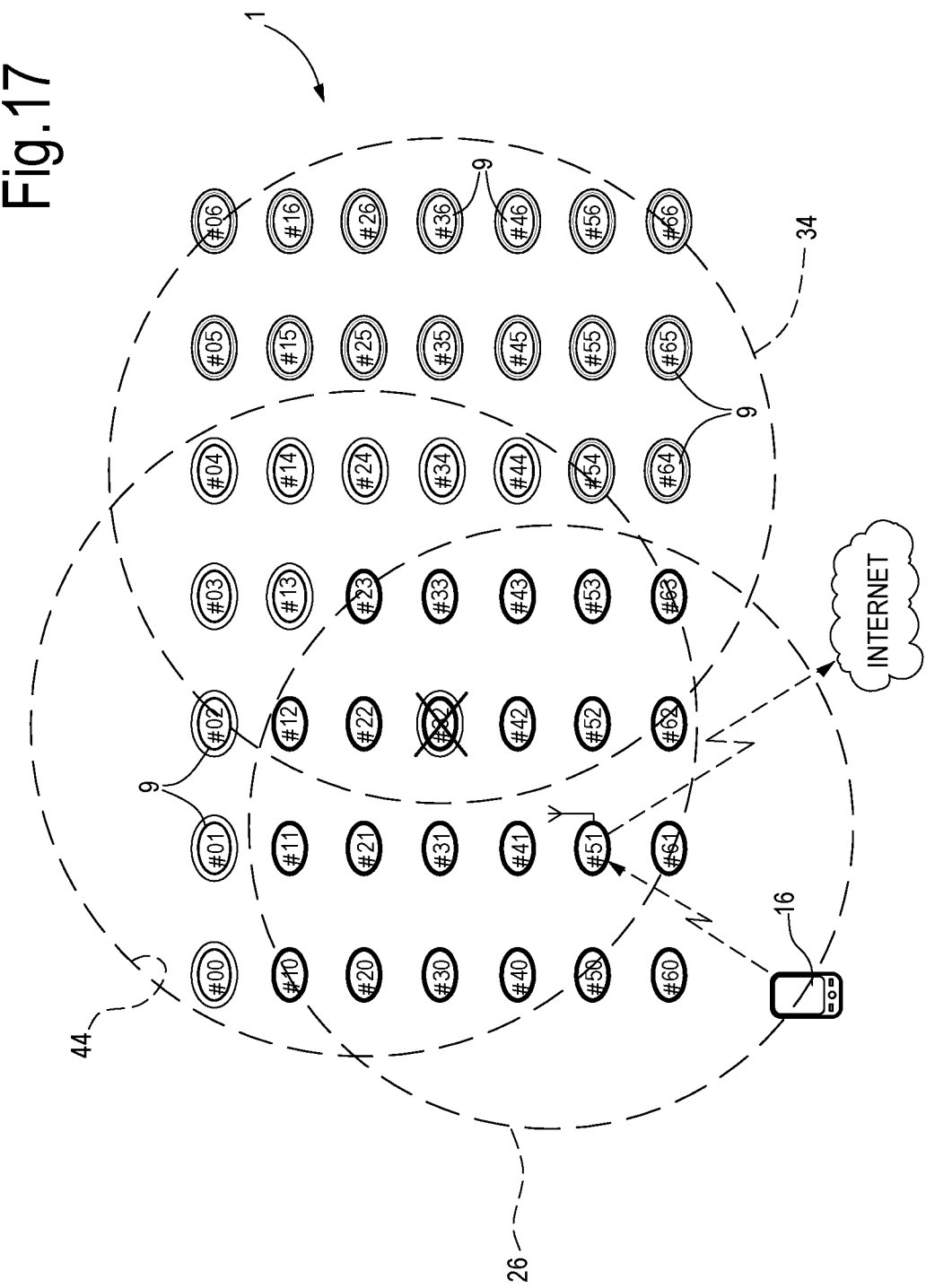

WIRELESS COMMUNICATION NETWORK

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: European Patent Application No. 17152792.2 filed on Jan. 24, 2017 entitled "Wireless Communication Network."

TECHNICAL FIELD

The present invention concerns networks of electronic devices, which require exchanging data with a remote monitoring center station through a gateway.

BACKGROUND

Electronic devices, such as solar inverters, are installed on the field and need to be monitored to verify their behavior and collect data on the generated power, for instance. Monitoring could be implemented through a wired network, e.g. through a wired network using Rs485, CAN, Ethernet or other connection technologies. Alternatively, a wireless network can be used, e.g. ZigBee, Bluetooth, WiFi, using some legacy protocol over the 802.15.4 or other solutions.

A WiFi installation typically needs several access points (APs), in particular if the inverters are spread over a wide area. In addition, the APs need to be connected to one another. The connection between access points is usually provided by a backbone structure, typically an Ethernet structure, to permit the correct networking for incoming/outcoming data traffic.

FIG. 1 schematically illustrates a network 200 comprised of a plurality of electronic devices 201, which are divided in sub-sets 201.1, 201.2, 201.3 . . . . The electronic devices 201 of each subset are in data communication relationship with a respective access point 203. More specifically, in the schematic of FIG. 1 there are four access points 203.1, 203.2, 203.3, 203.4, each access point providing a wireless connection 204.1-204.4 with the electronic devices of the relevant sub-set 201.1, 201.2, 201.3, 201.4. The access points 203.1-203.4 form part of an IT infrastructure and are in data communication relationship through transmission channels 206.1, 206.2, 206.3, 206.4 with a communication gateway 207. The access points 203 and the transmission channels 206 form a backbone structure. Transmission channels 206.$i$ can be wired (e.g. an Ethernet network) or wireless (e.g. a WiFi network).

The physical positioning of the electronic devices 201.1-201.4 (e.g. solar inverters) can be difficult to predict. In particular, solar panels may require to be installed on asymmetric roofs. In some cases, an extremely large number of solar photovoltaic panels are widely distributed over very extensive areas, including hills and valleys. When low power devices are used (e.g. microinverters or low power solar string inverters), the number of inverters forming a single installation may become very large. Each inverter must be in data communication relationship with a gateway, through which data collected by each inverter is transmitted to a user portal, for instance.

In this scenario, it is difficult to maintain good radio coverage over the installed electronic devices 201.$i$. A large number of access points 203.$i$ is required, with relevant IT infrastructure. The network as a whole is complex to design, install and maintain. Changes in the network layout may become necessary, e.g., in case the number and arrangement of the photovoltaic panels, wind turbines or the like, and relevant inverters are modified. The signal strength between each electronic device and relevant access point may change, e.g., due to environmental factors, such as climate conditions, electromagnetic noise and the like. In such case, it might be expedient to modify the arrangement of the connections between electronic devices 201.$j$ and access points 203.$j$, or would be useful to displace the access points 203.$i$ or to increase their number. These interventions, however, require time and technical skill.

A need therefore exists, for a more efficient criterion to set-up and manage a wireless network of electronic devices requiring connection to a gateway for data transmission.

BRIEF SUMMARY

According to a first aspect, a wireless network for connecting a plurality of electronic devices is provided. In embodiments disclosed herein, the network comprises a plurality of electronic devices in data communication relationship with a data collection unit having a wireless network access point. According to exemplary embodiments, each electronic device comprises a wireless communication unit featuring a station mode function and an access-point mode function, i.e., capable of acting as an access point and/or as a station. Moreover, in embodiments disclosed herein each electronic device of a first set of electronic devices is directly linked, through the station mode function of the respective wireless communication unit, to the wireless network access point of the data collection unit. According to some aspects disclosed herein, if the signal range of the wireless network access point does not reach all devices of the network, the wireless communication unit of another device can be selected to act as an additional access point, providing a network extension or bridge.

As several wireless communication units have both an access point mode and a station mode available, as a wireless communication unit acting as an access point become unavailable, e.g., due to a fault, to disturbances on the transmission channel, or any other reason, another wireless communication unit can be selected to provide its access point function to extend the network and provide network access to devices previously linked to wireless communication unit that has become temporarily or permanently unavailable.

According to some embodiments, the electronic devices of the wireless network can be grouped into said first set of electronic devices and at least a second set of electronic devices. In exemplary embodiments, an electronic device of the second set of electronic devices can be directly linked, through the respective wireless communication unit, to the wireless communication unit of a selected electronic device of the first set, which provides an access point function. In such way each electronic device of the second set is indirectly linked, through the wireless communication unit of the selected electronic device of the first set, to the wireless network access point of the data collection unit. This arrangement can be expanded by providing more than two sets of electronic devices in an upstream-to-downstream arrangement, i.e., in a cascade arrangement. Each second and further set of electronic devices groups together those electronic devices, which are connected, through the station mode function of their respective wireless communication units, to a selected one of the electronic devices of an upstream set, said selected electronic device having a wireless communication unit, which provides its access point mode to act as a network extender or bridge.

In exemplary embodiments, the network comprises the first set of electronic device and a plurality of further one or more sets of electronic devices in a cascade arrangement, wherein each electronic device of one set is directly linked, through the respective wireless communication unit, to the wireless communication unit of a selected electronic device of an upstream set, such that each electronic device of the network, other than the electronic devices of the first set, are indirectly linked to the wireless network access point of the data collection unit through the wireless communication unit of at least one selected electronic device of an upstream set of electronic devices of said cascade arrangement.

In some embodiments, the data collection unit can be connected to the internet. The internet connection can provide coupling to a server. Data concerning the electronic devices can be gathered and stored by the server. A managing entity, accessing the server, may thus have access to the collected data. In some embodiments, the electronic devices can be part of a regenerative power plant, for instance a photovoltaic power plant, a wind turbine plant or the like. Electronic devices may include inverters or micro-inverters functionally coupled to one or more electric generator, such as a photovoltaic panel, a string or matrix of photovoltaic panels, a wind turbine, a water turbine or any other power generating unit. The inverter provides for power conditioning and may be used to deliver the conditioned power to a local electric power distribution network, in an isle mode, or else to a public electric power distribution grid. The operating data, relating e.g. to the total amount of energy produced by each generator, the power instant power produced during time, the input and output voltage and/or current, the temperature, the rotational speed or other electric, mechanical or thermodynamic parameters of the generator or of the inverter coupled thereto may be collected by the wireless network and transmitted to the server for further use by the managing entity which owns or manages the plant.

Exemplary embodiments of the wireless network disclosed herein allow a dynamic adaptation of the wireless network to variable operating conditions, for instance to a fault of one or more wireless communication units, or to other environmental factors that may impair communication between wireless communication units. Also, embodiments disclosed herein allow the network to be expanded or extended or simply modified, by modifying the spatial arrangement of existing electronic devices and/or by adding new electronic devices or removing existing electronic devices from the wireless network.

In general, data can be generated by or at the electronic device and transmitted through the wireless network towards the data collection unit. The wireless communication network can also be used to deliver data or commands from a server through the network to one, some or all electronic devices, cumulatively or selectively.

The data collection unit of the network can be connected, e.g., to the internet. For this purpose, a communication gateway can be provided. The data collection unit can be in data communication with the communication gateway. The communication between the data collection unit and the communication gateway can be a wired or wireless connection. In some embodiments, an internet connection through a modem or a router can be provided. In other embodiments a cell phone connection, e.g. through a SIM card can be provided.

In exemplary embodiments, the data collection unit is featured by one electronic device of the first set, i.e., one of the electronic devices belonging to the first set of electronic devices of the network can collect data from the remaining electronic devices through the wireless network and can further provide for transmitting said data to a server, e.g., through the internet. This can be achieved e.g. by using a SIM card of the electronic device.

In some embodiments the electronic devices can be arranged in fixed position forming stationary nodes of the wireless network. Movable electronic devices and relevant wireless communication units can, however, also be provided. A mixed arrangement of stationary network nodes and movable network nodes can be envisaged as well.

In exemplary embodiments of the network disclosed herein some, or each electronic device can be configured for periodically searching for unconnected electronic devices. In a manner known to those skilled in the art, each electronic device may be provided with information on the number of electronic devices of the network and on their mutual connection. This information can be used by each or some device to continuously or periodically check whether some node of the network (i.e. some electronic device) has lost connection to the network. It becomes thus possible to modify the wireless arrangement to replace for instance a broken or temporarily unavailable device acting as an access point, to re-connect temporarily isolated nodes of the network. Examples disclosed in connection with the attached drawings will provide more details on this option.

For instance, the electronic devices can be configured such that, if an unconnected electronic device is found, one of the electronic devices already connected to the network and in data exchange relationship with the data collection unit is selected to act as an extender or bridge towards the unconnected electronic device.

According to embodiments disclosed herein, the electronic devices can be configured such that, if a plurality of searching electronic devices find an unconnected electronic device, the searching electronic device detecting the strongest signal from the unconnected electronic device will be selected to act as an extender or bridge towards the unconnected electronic device.

A dynamic adaptation of the network can thus be achieved.

New electronic devices can easily be added to the network, and they can automatically connect to the network.

According to another aspect, a method for establishing a wireless network of electronic devices is disclosed herein.

According to some embodiments, a method is disclosed, for connecting a first set of electronic devices in data communication with a data collection unit having a wireless network access point, each electronic device of said first set being comprised of a wireless communication unit featuring a station mode function and an access point mode function.

According to exemplary embodiments, the method comprises the following steps:

a) providing network credentials to a selected one of said first set of electronic devices;

b) propagating said network credentials from said selected electronic device to the other electronic devices of said set of electronic devices, thus connecting said first set of electronic devices to the same network and establishing a data communication connection between the wireless network access point of the data collection unit and respective wireless communication units of said first set of electronic devices.

The method can further comprise the following additional steps:

c) selecting one of the electronic devices of the first set, the wireless communication unit whereof acting as an extender or bridge towards electronic devices of a second set of electronic devices;

d) establishing a data communication connection between the wireless communication unit of said selected electronic device of the first set and the wireless communication units of electronic devices of the second set of electronic devices.

This process can be reiterated for a plurality of electronic device sets in a cascade arrangement, such that a virtually endless network can be generated. Each second and subsequent set of electronic devices will include at least one electronic device, the wireless communication unit whereof provides an access point for a downstream additional set of electronic devices. The method can for instance further comprise the following steps:

e) selecting one of the electronic devices of the second set, the wireless communication unit whereof to act as an extender or bridge towards electronic devices of a further set of electronic devices;

f) establishing a data communication connection between the wireless communication unit of the selected electronic device of the second set and the wireless communication units of electronic devices of the further set of electronic devices.

The method can further include the following steps:

g) selecting one of the electronic devices of the further set, the wireless communication unit whereof to act as an extender or bridge towards electronic devices of a yet further set of electronic devices;

h) establishing a data communication connection between the wireless communication unit of the selected electronic device of the further set and the wireless communication units of electronic devices of the yet further set of electronic devices;

i) repeating steps (g) and (h) until all electronic devices are in direct or indirect data communication with the wireless network access point of the data collection unit.

According to some embodiments the method can further include the steps of:

each electronic device periodically scanning to search for electronic devices which are not connected to the wireless network access point;

if one or more unconnected electronic device is found, selecting one of the scanning electronic device, the wireless communication unit whereof to act as an extender or bridge towards the unconnected electronic devices;

establishing a data communication between the wireless communication unit of the selected scanning electronic device and the unconnected electronic devices.

According to a further aspect, a network is disclosed, comprising a plurality of electronic devices in data communication relationship with a data collection unit having a wireless network access point, wherein:

each electronic device comprises a wireless communication unit featuring a station mode function and an access-point mode function;

said electronic devices are divided into a plurality of sets in a cascade arrangement, each set comprising a plurality of electronic devices;

the electronic devices of a first set are directly connected, through the respective wireless communication units, to the wireless network access point of the data collection unit;

a wireless communication unit of a selected electronic device of each set is configured as a bridge or extender towards the wireless communication units of the electronic devices of a downstream set of electronic devices of said cascade arrangement.

Each electronic device can be configured for periodically searching for unconnected electronic devices and for selecting one of the electronic devices, which have detected unconnected electronic devices, to establish a bridge or extension towards the unconnected electronic devices.

While in the present description specific reference will be made to a network comprised of renewable energy generators, such as photovoltaic panels, wind turbines, fuel cells, small water turbines, or the like, and relevant inverters, the wireless network of the present disclosure may include or be formed by other electronic devices and can for instance be embodied in a so-called internet-of-things, including electronic devices of different nature and kind, in data exchange relationship e.g. with a central station for monitoring or managing.

Further features and embodiments of the method according to the invention are set forth in the appended claims and are disclosed in the following description.

BRIEF DESCRIPTION OF THE SEVERAL VIEWS OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates a schematic of a network according to the current art, as described above;

FIG. 2B illustrates a portion of a network according to FIG. 2A, wherein each electronic device is connected to a set or string of photovoltaic panels;

FIGS. 3 to 7 illustrate diagrams showing a way of establishing a connection among devices of a network according to the present disclosure, in an exemplary embodiment;

FIGS. 13 and 14 illustrate diagrams showing a way of establishing a connection among devices of a network according to the present disclosure, in another exemplary embodiment;

FIGS. 15 to 17 illustrate diagrams showing how the network dynamically adapts to anomalous operating conditions.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description, reference will be made specifically to a solar plant, comprised of an arrangement of photovoltaic panels and relevant inverters, as well as possible other electronic devices, such as sensors, repeaters and the like. Those skilled in the art will however appreciate that several aspects of the subject matter disclosed herein can be used in other systems, comprised of a network including a plurality of electronic devices, which must be put in data communication relationship with a remote monitoring center station. In the context of the present description and claims, a remote monitoring center station may be any structure, where data concerning the operation of the electronic devices belonging to the network are collected and can be retrieved by the owner of the network, for instance. It shall therefore be understood that, while the following description will specifically refer to electronic devices represented by inverters of a photovoltaic installation, various features and advantages of the network and method for setting-up and managing the network can be exploited in other situations and environments, where a network of electronic devices, other than photovoltaic inverters may require to be set-up.

Figure 2A:
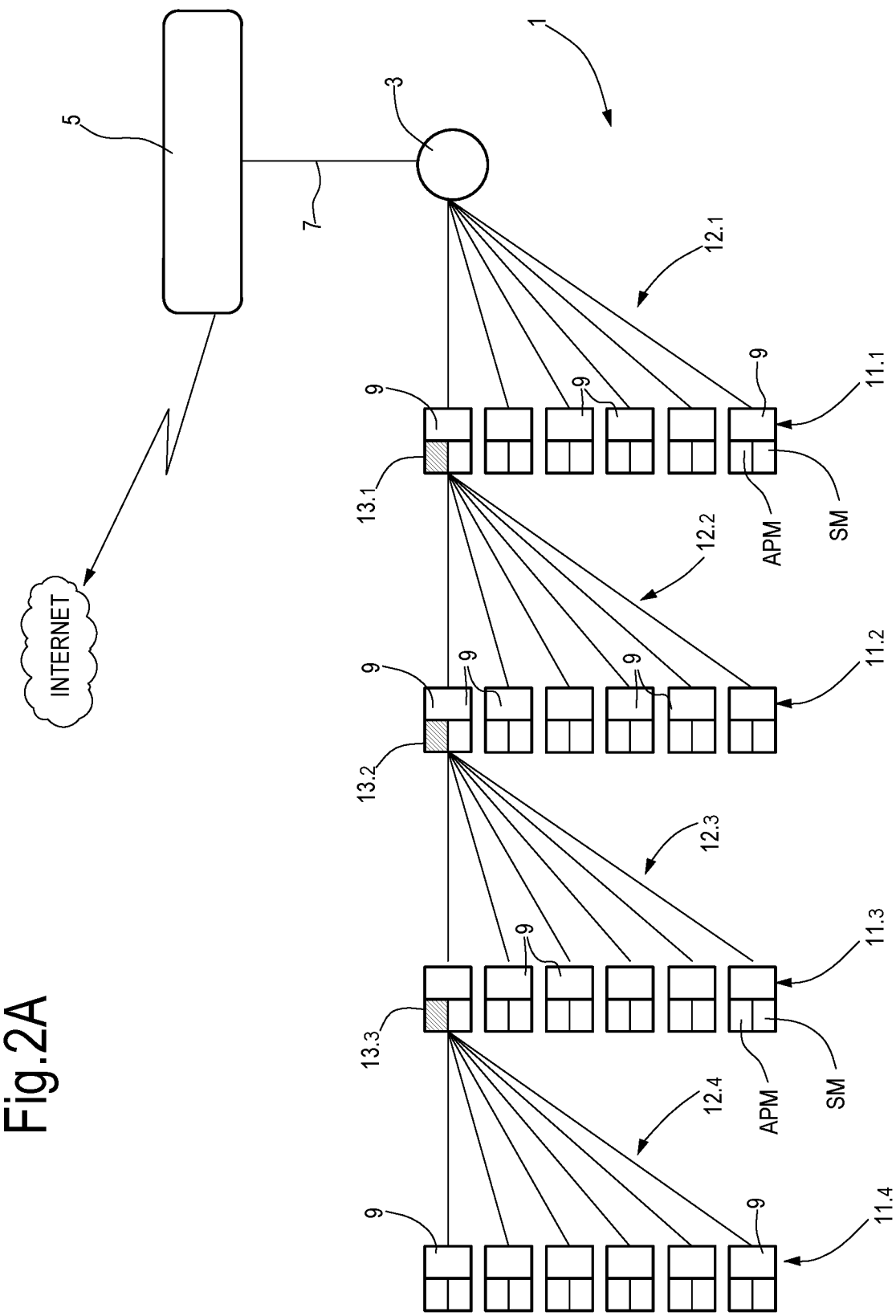
FIG. 2A illustrates a schematic of a network according to an embodiment of the present disclosure.

FIG. 2A illustrates a schematic of an exemplary embodiment of a network as disclosed herein. The network is labeled 1 as a whole. In FIG. 2A the network 1 comprises an access point 3 and a communication gateway 5. The access point 3 is in data communication relationship with gateway 5 through a wireless or wired communication channel 7. In some embodiments, the access point 3 and the gateway 5 can be part of a data collection unit 4.

The network 1 is further comprised of a plurality of electronic devices 9. Each electronic device 9 may include a photovoltaic inverter or micro-inverter. The electronic devices 9 are arranged according to a plurality of sets 11.1, 11.2, . . . . Each set comprises several electronic devices. In FIG. 2A each set contains the same number of electronic devices 9, but this is just by way of example and those skilled in the art will understand that each set of electronic devices could include a different number of such electronic devices. Also, while in the schematic of FIG. 2A each set 11.1, 11.2, . . . includes only six electronic devices 9, in general each set can include a smaller or, preferably, larger number of electronic devices, e.g. from one to several tenths or several hundreds of electronic devices.

Each electronic device 9 is comprised of a wireless communication unit 13, for example a WiFi communication unit. In FIG. 2A only some wireless communication units 13 of some electronic devices 9 are represented. Each wireless communication unit 13 features a station mode function and an access-point mode function, such that each electronic device 9 can use the wireless communication unit thereof for transmitting data to an access point, using the station mode function, and/or for receiving data from other wireless communication units, using the access-point mode function. More specifically the access point function is used to offer an access point to a wireless or Wi-Fi network. In the access point mode the wireless communication unit 13 acts as a server. Other wireless communication units 13 can join to a wireless communication unit 13 acting as an access point. Each wireless communication unit can also act as station, i.e. in a station mode. When the station mode is active, the wireless communication unit 13 acts as a client to ask to join another wireless communication unit 13 acting as an access point, to have access to a specific Wi-Fi network. In general, only one, some or all the electronic devices 9 of each set may include a wireless communication unit 13, whereof both the access-point mode function and the station mode function are simultaneously active.

In the schematic of FIG. 2A the above summarized double function mode is pictorially represented by each block 13 being divided into two fields, labeled APM (Access Point Mode) and SM (Station Mode), respectively. The wireless communication units 13.1, 13.2, 13.3 at both as access points and as stations. The wireless communication unit 13.1, for instance, acts as a station to connect the respective device 9 to the network access point 3 and as an access point for the devices 9 of the second row from the right. Each wireless communication unit 13 of the remaining devices 9 of the first row from the right operate in the station mode for connection to network access point 3. A similar situation appears in the second row from the right in FIG. 2A, wherein the wireless communication unit 13.2 of the upper device 9 acts in the station mode to connect with the access point provided by wireless communication unit 13.2. The wireless communication unit 13.2 further acts as an access point for the wireless communication units 13 of the third row from the right in FIG. 2A.

In the schematic of FIG. 2A the electronic devices 9 of a first set 11.1 are directly linked through their respective wireless communication units 13 and a wireless connection to access point 3. The wireless connection is shown schematically at 12.1. Data from the electronic devices 9 belonging to the first set 11.1 are thus transmitted directly to access point 3. Since the network 1 can be very extensive, electronic devices 9 of the remaining sets 11.2-11.4 may be outside the range of access point 3. In order to connect these additional electronic devices to access point 3, at least one wireless communication unit 13 in each set 11.1-11.4 of electronic devices 9 is used as a network bridge or extension. In the schematic example of FIG. 2A reference number 13.1 designates a wireless communication unit of a selected one of the electronic devices 9 of set 11.1, which functions as a network extender or bridge to connect the electronic devices 9 of set 11.2 to the selected electronic device 9 of set 11.1. By way of non-limiting example, the selected electronic device of set 11.1 is the top electronic device of the column of electronic devices 9. Reference number 12.2 schematically represent the wireless connection between the electronic devices of set 11.2 and the wireless communication unit 13.1.

Similarly, one of the electronic devices 9 in set 11.2 is selected to function as a network extender or bridge towards the third set 11.3 of electronic devices 9 through the wireless communication unit 13.2 and wireless channels 12.3. One of the electronic devices 9 of set 11.3 is in turn selected to function as a network extender or bridge towards the fourth 11.4 of electronic devices 9 through the wireless communication unit 13.3 and the wireless channels 12.4.

The network 1 therefore features a cascade arrangement of electronic device sets, whereof the first set 11.1 comprises electronic devices 9 which are directly linked to the network access point 3, while each electronic device of the remaining sets 11.2-11.4 comprises electronic devices that are indirectly connected to the access point 3, through one or more wireless communication units 13.*j* of a selected electronic device of the intermediate sets.

In some embodiments each electronic device 9.*j* can be an inverter or micro-inverter functionally and electrically coupled to a photovoltaic panel or to a string or set of photovoltaic panels. FIG. 2B schematically shows a portion of the system 1 of FIG. 2A, wherein three electronic devices 9, each provided with a respective wireless communication unit 13.2 is shown. Each electronic device 9 is electrically connected to an electric power distribution grid G and to a string or set of photovoltaic panels 10. A more detailed description of exemplary embodiments of networks and methods of setting up said networks according to the present disclosure is provided here below with reference to the attached drawings.

FIG. 3 illustrates an exemplary network 1, comprised of a plurality of electronic devices 9. For the sake of clarity, each electronic device 9 is numbered with a two-figure number from #00 to #66. The electronic devices 9 are arranged in a square-mesh arrangement, but this is merely an example and those skilled in the art will appreciate that the electronic devices 9 can be arranged differently, e.g. in a random manner.

Each electronic device 9 can include a micro-inverter of a field of photovoltaic panels. Each electronic device 9 can include a wireless communication unit featuring a station mode function and an access-point mode function, as schematically shown at 13.*j* (j=1-3) in FIG. 2A. In some embodiments, each electronic device 9 has a wi-fi equipment able to manage at least two WLAN accesses, typically a station connection and an access point connection.

Similarly to FIG. 2A, in FIG. 3 reference 3 indicates a network access point, which can be connected to a communication gateway 5, for instance through a wire-less or wired communication channel 7. The communication gateway 5 and the network access point 3 form part of a data collection unit 4, configured for wireless connection to the electronic devices 9.

In some embodiments, the communication gateway 5 can be configured for internet connectivity, for instance through a phone or cellular line.

In some embodiments, the electronic devices 9 can be placed at a distance from the network access point 3 such that each electronic device 9 can reach the network access point 3 directly.

In order to set up a network, wherein all electronic devices 9 are connected to the network access point 3, and thus in data exchange relationship with the data collection unit 4, the following method can be provided. In order for all electronic devices 9 to become part of the same network and get in communication with the network access point 3, each electronic device 9 shall be provided with the network credentials of the network access point 3. In some embodiments, the network credentials include an SSID (Service Set Identifier) and can include a password or a passphrase. In the exemplary embodiment of FIG. 3 all electronic devices 9 are within the wireless signal range of the network access point 3. The wireless signal range is schematically represented by closed line 18.

In current art networks, an operator shall provide the SSID, password or pass-phrase or other credentials of the network access point 3 to each electronic device 9, to enable each electronic device 9 to connect to the same wireless network.

Conversely, according to methods disclosed herein, an operator can provide the network credentials, e.g. the SSID and passphrase or password of the network access point 3, to one electronic device 9 only, while the credentials are then propagated to the other electronic devices automatically. In some embodiments, the operator may be provided with a portable device 16, such as a tablet or portable computer, with a wi-fi connection. Through the portable device 16 the operator connects to the access point of a selected one of the electronic devices 9. In the example of FIG. 3 the selected electronic device 9 is electronic device #51. Once the portable device 16 is connected to the selected electronic device #51, the operator provides the network credentials to the selected electronic device #51 through the access point thereof. The selected electronic device #51 has its own wireless signal range, represented by closed line 20 in FIG. 4. The network credentials can thus be transmitted by the selected electronic device through the station mode function of its wireless communication unit and received by neighboring electronic devices 9 in the wireless signal range 20 of the selected electronic device 9 using the access point function of the wireless communication unit of said neighboring devices. The electronic devices which receive the network credentials from electronic device #51 can thus connect to the network access point 3. In FIG. 5 those electronic devices 9 which have been connected to the network access point 3 are marked with bold lines.

In some embodiments if the wireless signal range 20 of the selected electronic device 9 (device #51) is sufficiently large, all electronic devices 9 can be reached by the wireless signal thereof and can thus all receive the network credentials at the same time. In the exemplary embodiment described herein, this is not the case.

In FIG. 5 those electronic devices 9 which are not connected to the network access point 3 yet, such as devices #03, #04, . . . #66 are marked in thin lines.

Figure 6:
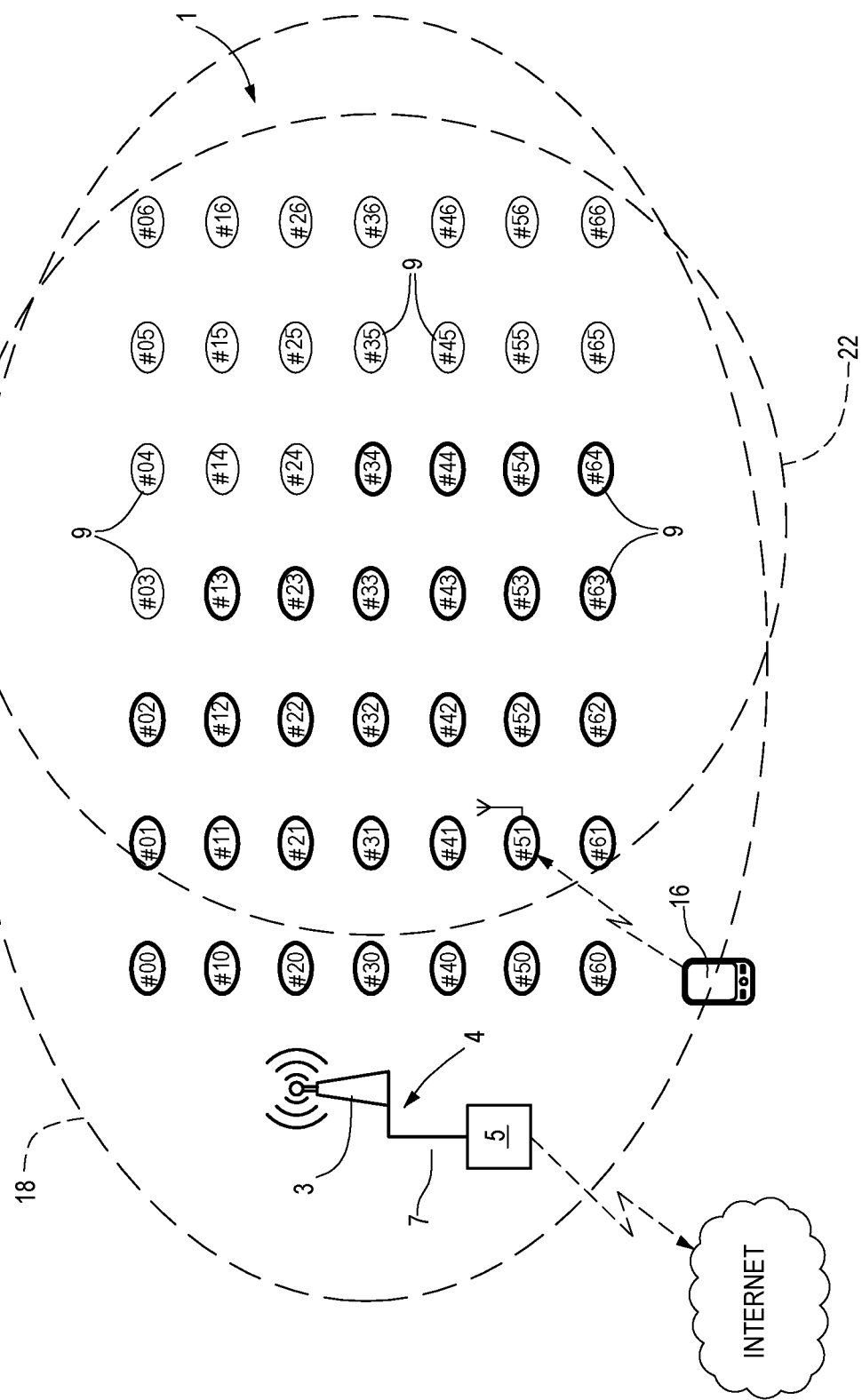
Figure 7:
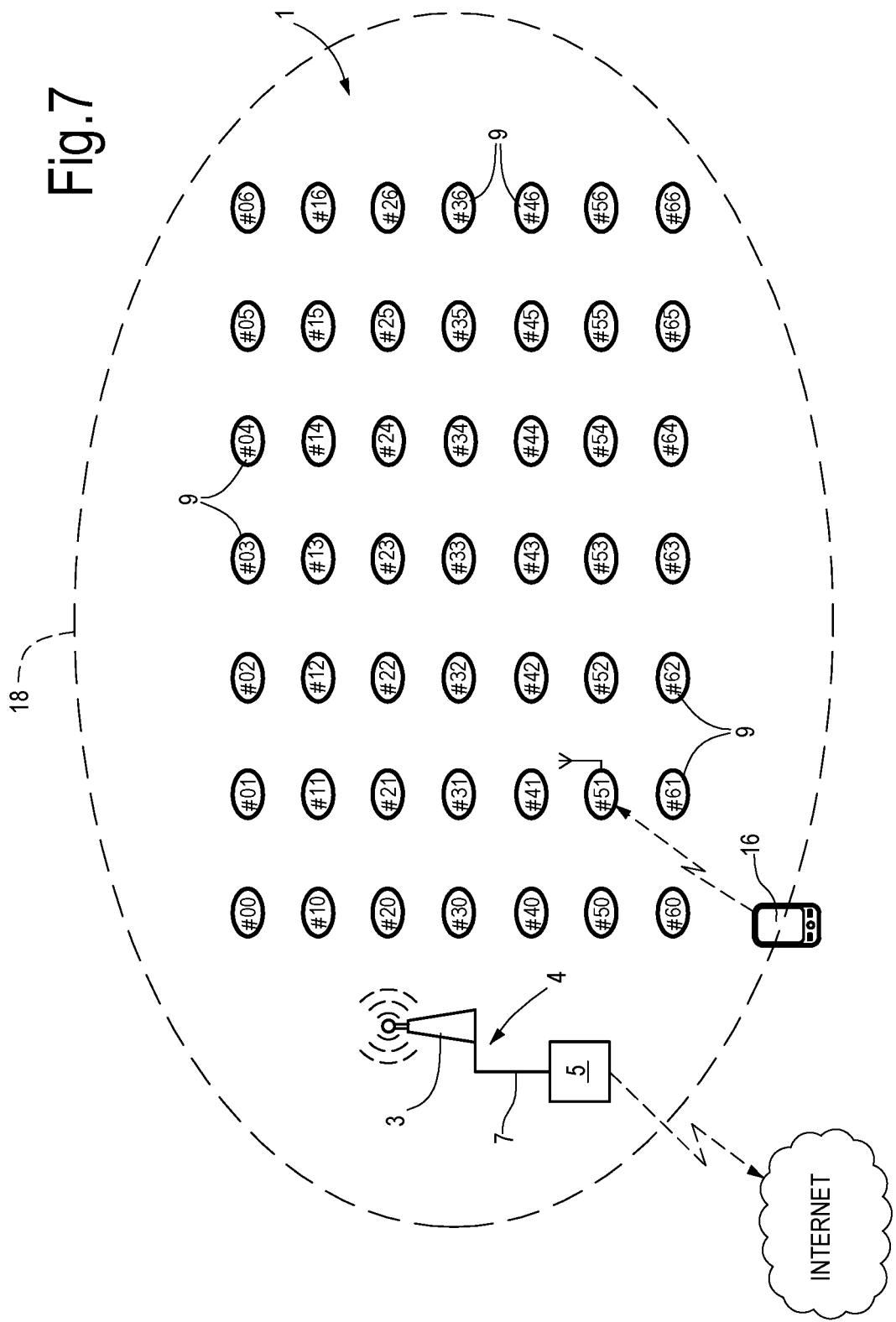
Figure 8:
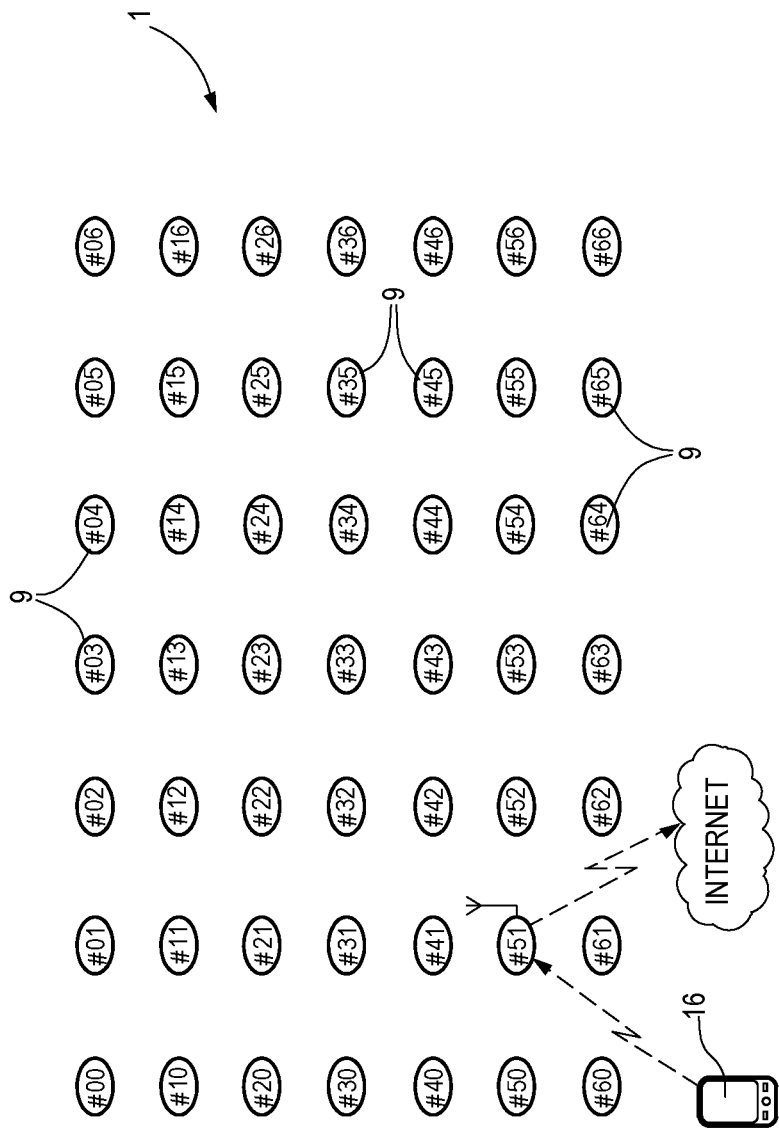
FIGS. 8 to 12 illustrate diagrams showing a way of establishing a connection among devices of a network according to the present disclosure, in another exemplary embodiment.

One, some or all electronic devices 9 that are connected to the network can now scan for un-connected electronic devices, i.e. to check if additional devices provided with a wireless communication unit are within their wireless range. Any connected electronic device which detects unconnected electronic devices can further propagate the network credentials to the unconnected electronic devices 9 which have been found. In FIG. 6 a wireless signal range of electronic device #34 is shown at 22. All yet unconnected electronic devices 9 are within wireless signal range 22 and can thus all receive the network credentials from electronic device #34 and connect to network access point 3. In FIG. 7 all electronic devices 9 are finally grouped in a single set and are all directly connected to the network access point 3 and this is schematically shown by all electronic devices 9 being marked in bold lines.

In some embodiments an electronic device network can be set up without the need for a network access point and a gateway, as shown in FIG. 2A and in FIGS. 3-7. In example embodiments one of the electronic devices 9 can in such case have a connectivity for connection to the internet, for instance through a cellular connection using a SIM card. FIGS. 8 to 12 illustrate embodiments wherein at least one of the electronic devices 9 is provided with an external connection. In this example electronic device #51 is again used as a starting point to set up the network and is also provided with an external connection, such as a SIM card. The selected electronic device #51 in this embodiment features the data collection unit of network 1. The wireless connection unit thereof features the wireless network access point, replacing access point 3 of FIG. 3.

The operator connects to electronic device #51 via a portable device and provides the network credentials to electronic device #51. The SIM card of device #51 can be used for connection to the internet, while the wireless connection function of #51 is used for connection to the remaining devices 9 of system 1.

Figure 9:
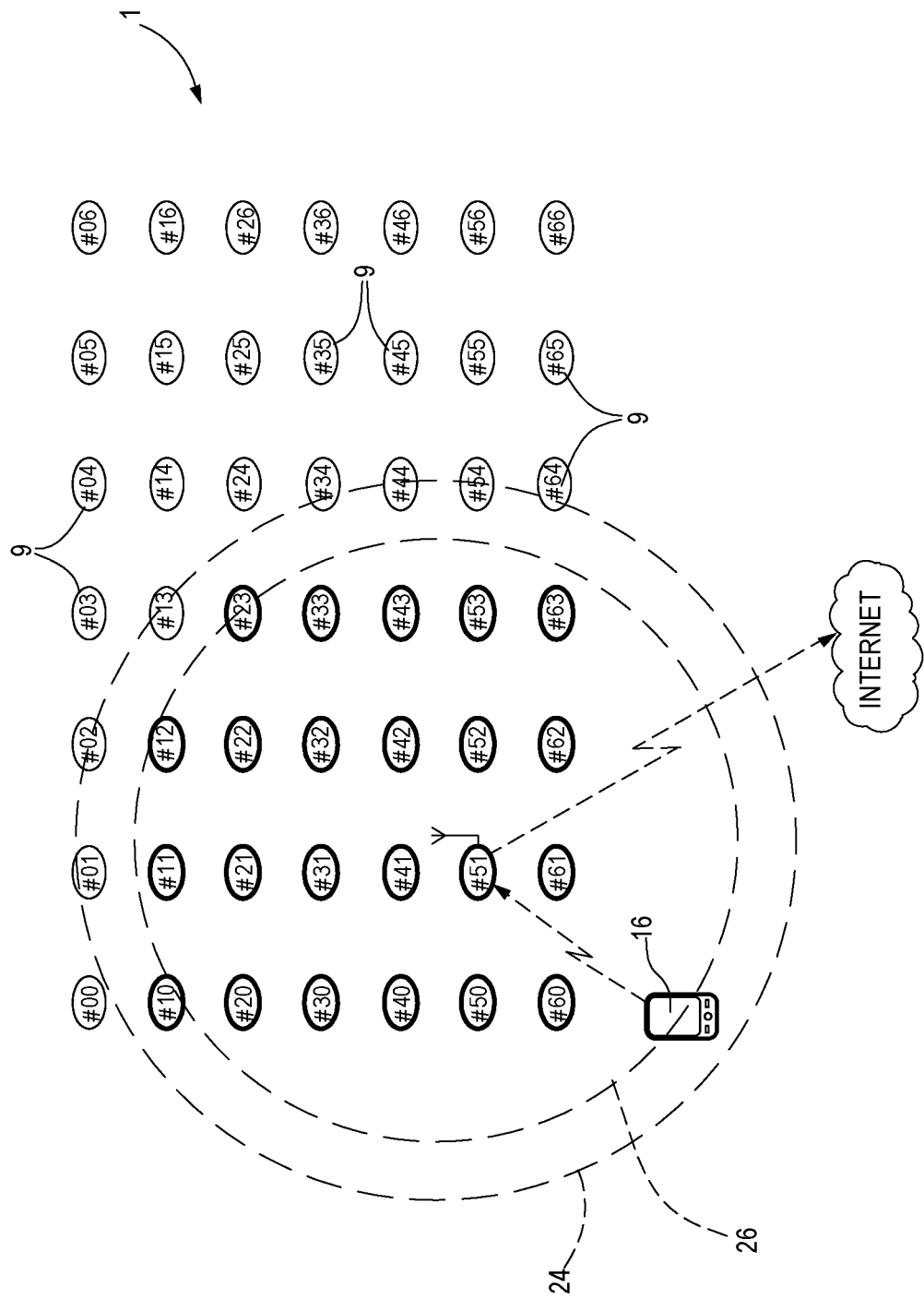

The electronic device #51 can now scan for adjacent electronic devices within its wireless signal range. In FIG. 9 to wireless signal ranges 24 and 26 are shown. The first one is the full range coverage of electronic device #51, while the second one is a safeguard area where connectivity is more reliable. Any KPI (Key Performance Indicator) can be used to define the narrower wireless signal range 26, such as a RSSI (Received Strength Signal Indicator) or SNR (Signal Noise Ratio).

The electronic devices 9 located within the wireless signal range 26 can now connect to electronic device #51. They are marked in bold lines n FIG. 9 and form a first set of electronic devices 9. One, some or all the electronic devices 9 of the first set, which are now connected to the network, can scan for unconnected electronic devices in their wireless signal range.

Figure 10:
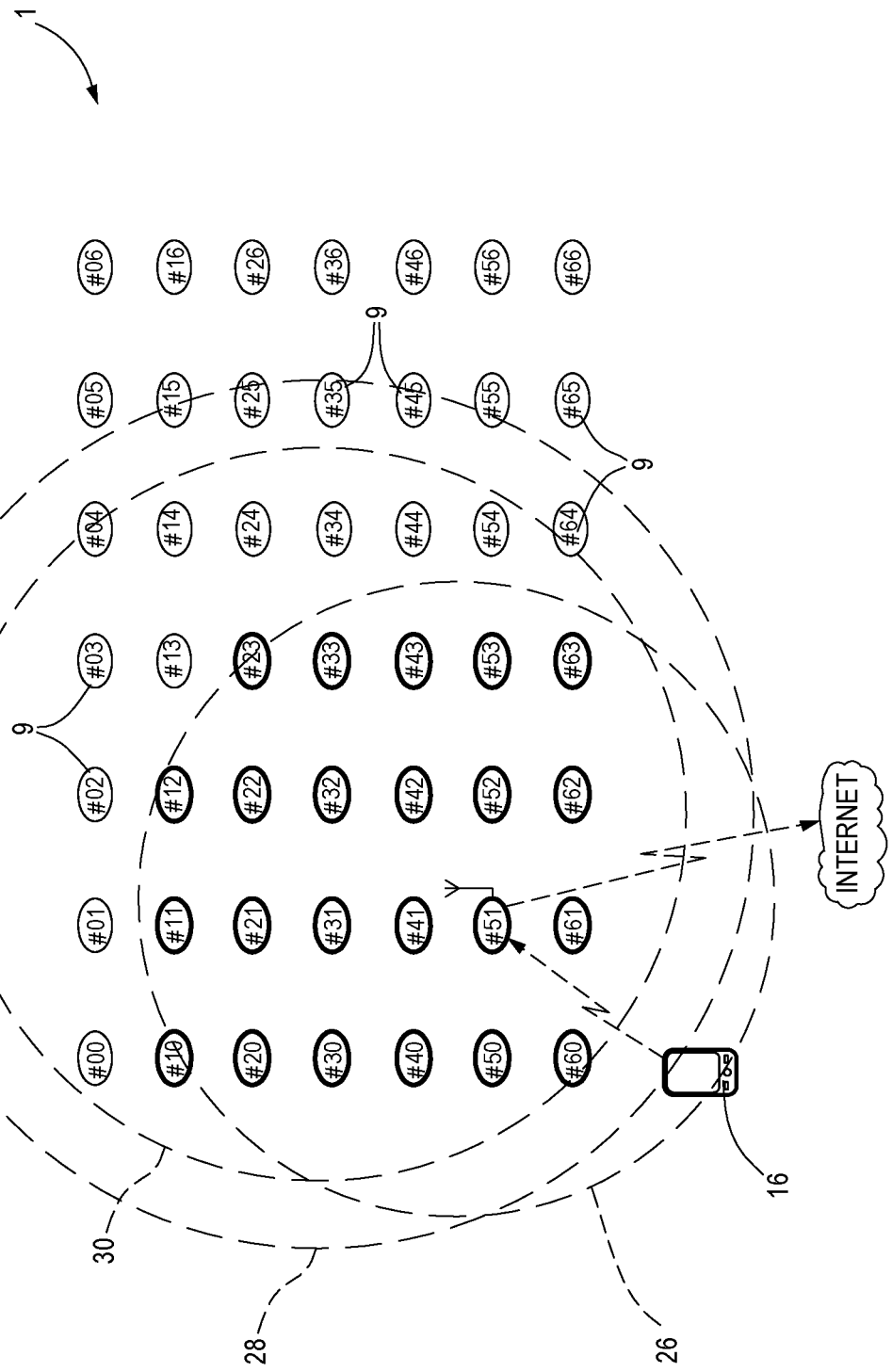

By way of example, in FIG. 10 two wireless signal ranges 28 and 30 for electronic device #32 are shown. Only the smaller range 30 is considered, similarly to what has been done for electronic device #51. Electronic devices #00-#04, #13, #14, #24, #34, #44, #54 and #64 fall within the smaller wireless signal range 30 of electronic device #32. They form a second set of electronic devices. Electronic device #32 is now selected to act as a network extender or bridge to propagate the network credentials, received from the portable device 16 though electronic device #51, towards the electronic devices 9 of the second set and provide network credentials thereto, such that the electronic devices 9 of the second set can connect to electronic device #32 and, through this latter, be placed in indirect data communication with the first node of the network, i.e. the electronic device #51. The station mode function of the wireless communication unit of electronic device #32 is used to propagate the network credentials, which are received by the electronic devices of the second set through the access-point mode function of their respective wireless communication units.

Figure 11:
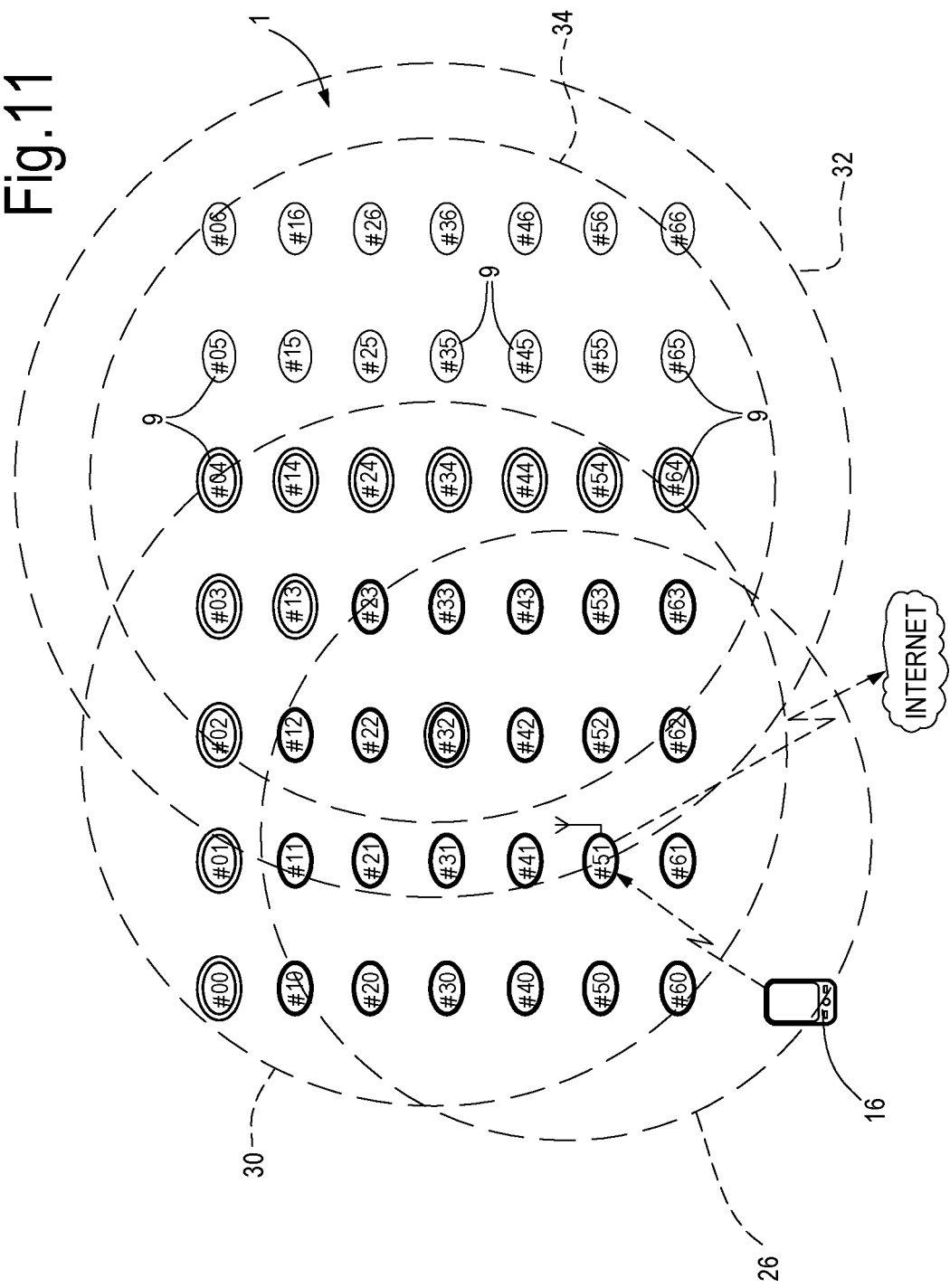
Figure 12:
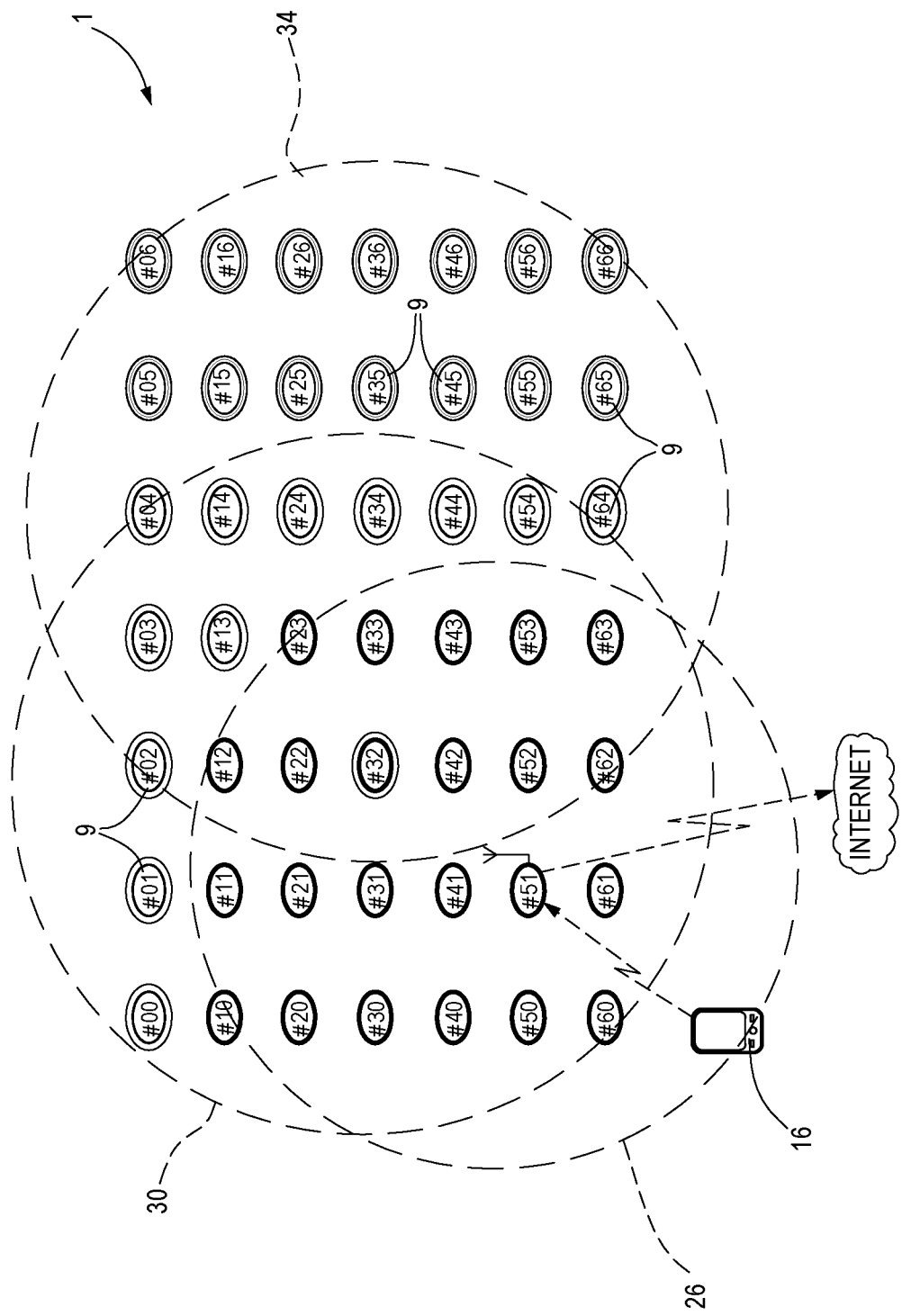

The situation now reached is pictorially represented in FIG. 11, wherein the electronic devices 9 of the first set are shown with a single bold line and the electronic devices 9 of the second set are shown with a double line.

One, some or all electronic devices of the second set can scan for additional, yet unconnected devices, which in FIG. 11 are pictorially represented by a single thin line.

For instance, electronic device #34 can be selected to operate as a further network extender or bridge to propagate the network credentials towards electronic devices which are arranged within a wireless signal range 32 or, preferably, within a smaller wireless signal range 34. The electronic devices not yet connected to the electronic device #32, and indirectly to the electronic device #52, and which fall within the wireless signal range 34 form a third set of electronic devices.

The station mode function of the wireless communication unit of electronic device #34 is used to propagate the network credentials, which are received by the electronic devices of the third set through the access-point mode function of their respective wireless communication units. The electronic devices of the third set become thus indirectly connected to the electronic device #51 through a first network extender or bridge (electronic device #32) and a second network extender or bridge (electronic device #34). This is pictorially represented in FIG. 12, wherein the connected electronic devices of the third set are each represented by three concentric lines.

A network is thus set-up in a substantially automatic way, by communicating the network credentials via portable device 16 to a single electronic device #51. Propagation of the network credentials to the other electronic devices 9 of the network 1 is obtained automatically by exploiting the wireless communication units of the electronic devices, each of which features a station mode function and an access-point mode function. Once the network is set-up each electronic device 9 is in data communication relationship, either directly or indirectly, with the electronic device #51. The electronic devices of the first set are directly linked to electronic device #51; the electronic devices of the second set are indirectly linked to electronic device #51 through electronic device #32; the electronic devices of the third set are indirectly linked to the electronic device #51 through electronic device #32 and electronic device #34.

According to further embodiments of the method and of the network disclosed herein a network access point and one or more network extenders or bridges could be provided to connect all the electronic devices 9 to the network. In FIG. 13 schematically illustrates a network 1 wherein a plurality of electronic devices 9 (numbered from #00 to #66) shall be connected to a data collection unit 4, comprised of a network access point 3 and a communication gateway 5, which can provide connection to an external network, e.g. to the internet. Reference number 40 indicates the wireless signal range of the network access point 3. As shown in FIG. 13, only a first set of electronic devices 9 are within the wireless signal range 40. A second set of electronic devices are outside the wireless signal range 40 of the network access point 3 and cannot be directly connected thereto.

According to some embodiments disclosed herein, to connect all electronic devices 9 to the network access point 3 in a first step the network credentials, e.g. the SSID and password or passphrase can be provided to a selected one of the electronic devices 9 belonging to the first set, i.e. those within the wireless signal range 40 of the network access point 3. In the example of FIG. 13 electronic device #51 has been selected for this purpose. An operator can provide the network credentials to electronic device #51 through a portable device 16, for instance. These credentials are transmitted to all electronic devices 9 of the first set in a way similar to what has been described with reference to FIGS. 4 to 7. These devices become therefore connected to the network access point 3 and are represented in bold lines in FIG. 13.

Electronic devices 9 of the second set can be connected to the network access point 3 through a network extender or bridge. One of the electronic devices 9 belonging to the first set can be selected to operate as a network extender. In FIG. 14 the electronic device #34 of the first set is selected as a network extender or bridge. The presence of yet unconnected electronic devices can be detected by a scan performed by electronic device #34, or by one or more other electronic devices of the first set.

The network credentials are now transmitted by electronic device #34 to the electronic devices 9 of the second set, which are within a wireless signal range 42 of the selected electronic device #34. All the electronic devices 9 of the second set become thus indirectly connected to the network access point 3 through the electronic device #34 acting as a network extender. The connected electronic devices 9 of the second set are marked with a double line in FIG. 14.

In the example embodiment of FIGS. 13 and 14 no further electronic devices 9 are present. In other embodiments, however, a scan performed by the already connected electronic devices 9 can discover additional, not yet connected electronic devices 9 which may form a third or yet further sets of electronic devices, which can be put in indirect data communication with the network access point 3 by iterating the steps described above in reference to FIGS. 13 and 14. Each time an additional set of not yet connected electronic devices is found, a network extender can be selected among the already connected electronic devices of one of the sets of connected devices. At the end of the process each electronic device 9 of the network 1 will be in data communication with the network access point 3 either directly (first set of electronic devices, within the wireless signal range of the network access point 3) or indirectly, through one or more electronic devices 9 acting as network extenders or bridges.

The network credentials are automatically propagated from the electronic device #51, whereto the network credentials have been provided by the operator. Network credentials and flow through the network nodes represented by the electronic devices 9 exploiting the wireless communication units featuring both a station mode function and an access-point mode function, each electronic device 9 is provided with. In embodiments wherein all electronic devices 9 are directly connected to the network access point 3, as shown in FIGS. 3-7, if any electronic device 9 becomes unavailable, e.g. due to failure thereof, or due to a disturbance on the wireless transmission channel for instance, all remaining electronic devices 9 will stay connected to the data collection unit 4. If, however, the network comprises one or more network ex-tenders, as shown e.g. in FIG. 12 or 14, failure of one of the electronic devices 9 acting as network extenders will split the network into separate network portions, whereof at least one will lose connection to the data collection unit. According to some embodiments, the electronic devices can be configured to remedy a failure situation and re-establish a data communication connection of all electronic devices, except the broken one, with the data collection unit.

By way of example, FIG. 15 illustrates a network 1 wherein an electronic device 9 (electronic device #51) has a connection to an external network, e.g. to the internet. As mentioned in connection with FIG. 8, connection with the internet can be via a cellular SIM card or the like. The network 1 is comprised of three sets of electronic devices, which are pictorially represented by different lines encircling each electronic device. A first set of electronic devices, represented in bold lines, are in direct data communication with the data collection unit (electronic device #51) and are contained within the wireless signal range of the electronic device #51. A second set of electronic devices, represented with a double line, are in direct data communication with a network extender or bridge, represented by electronic device #32 and, through this latter, in indirect communication with electronic device #51. A third set of electronic devices, represented triple lines, are in direct data communication with a second network extender or bridge, represented by electronic device #34 and therefore in indirect data communication with the data collection unit (electronic device #51) through electronic devices #34 and #32.

If electronic device #32 becomes inactive, the network 1 will split into a first part, comprised of the electronic devices which remain directly linked to the data collection unit (electronic device #51) and all the remaining electronic devices of the second set and of the third set. Each electronic device of the third set will remain connected to the network extender (electronic device #34), while each electronic devices of the second set will be isolated. Lack of connection with the devices of the second set is detected since no data are received from said devices anymore.

A different electronic device 9 of the first set will be selected to replace the previously selected electronic device #32 acting as a network extender. In the example of FIG. 16, electronic device #22 is selected as a new network extender and will connect to at least part of the electronic devices of the second set, namely those which are within the wireless signal range 44 of electronic device #22. Selection of a new electronic device 9 to act as a new network extender can be obtained by any suitable means. For instance, each device 9 still connected to the network can be informed that a portion of the network is disconnected and can start a routine to elect itself as a new network extender.

By way of example, in FIG. 16 all the electronic devices of the second set, except electronic devices #54 and #64 are within the wireless signal range 44 of electronic device #22. These electronic devices #54 and #64 will be connected to the second network extender or bridge (electronic device #34) and become part of the third set of electronic devices. FIG. 17 illustrates the new distribution of electronic devices 9 among the three sets of electronic devices with the same notation used in FIG. 15.

It shall be noted that each node (i.e. each device 9) of the network is always informed about the network status, since it receives a list of connected nodes or devices and information on the network structure, i.e. on the connections among nodes of the network. Each device 9 can thus react upon detection of an anomaly, consisting e.g. of a broken node or device 9 acting as an extender. Also, anomalies whereto the devices or nodes 9 of the network can react may involve troubles with the wireless connection among devices 9, e.g. due to electromagnetic noise, adverse environmental conditions or other factors.

Each node or device 9 which detects the unavailability of a network extender due to any one of the above or other anomalies, can start a routine to elect itself as a new network extender or bridge. To avoid a conflict between network extenders, or a needless proliferation of network extenders, measures can be taken to prevent a temporary unavailability of a network extender node to cause selection of a new network extender or bridge node. This can be done e.g. by providing a delay prior to start the above mentioned routine. Each device 9 which detects an anomaly in the network, which causes a network extender or bridge to be unavailable will start the routine for electing itself as a new network extender by a delay time which can be fixed, preprogrammed, random or set in any other suitable way. If, during said delay time, the temporarily unavailable network extender or bridge becomes available again, or if another device 9 has started to act as a network extender, the routine is terminated. For example, a delay can be calculated based on a unique ID number or serial number of the device. In this manner, each device 9 will have a different delay time, to avoid collisions. In other embodiments, the delay can be calculated randomly, e.g. based on a number generated by a random number generator, or the like.

By selecting a different electronic device 9 which replaces electronic device #32 in its network extender function the entire network is re-established and all electronic devices are connected again, either directly or indirectly, to the data collection unit 4.

Thus, although there have been described particular embodiments of a new and useful invention, it is not intended that such references be construed as limitations upon the scope of this invention except as set forth in the following claims.

What is claimed is:

1. A method for connecting a first set of electronic devices in data communication with a data collection unit having a wireless network access point, each electronic device of said first set being comprised of a wireless communication unit featuring a station mode function and an access-point mode function; the method comprising the following steps:
   (a) providing network credentials to a selected one of said first set of electronic devices, the selected one of said first set of electronic devices being directly linked to the wireless network access point via the station mode function of the respective wireless communication unit;
   (b) propagating said network credentials from said selected electronic device to the other electronic devices of said set of electronic devices, thus connecting said first set of electronic devices to the same network and establishing a data communication connection between the wireless network access point of the data collection unit and respective wireless communication units of said first set of electronic devices;
   each electronic device periodically scanning to search for electronic devices which are not connected to the wireless network access point;
   when one or more unconnected electronic devices are found, selecting one of the scanning electronic devices, wherein the wireless communication unit of the selected scanning electronic device acts as an extender or bridge towards the one or more unconnected electronic devices via its respective access-point mode function; and
   automatically establishing a data communication between the wireless communication unit of the selected scanning electronic device and the unconnected electronic device.

2. The method of claim 1, further comprising:
   (c) selecting one of the electronic devices of the first set, the wireless communication unit whereof acting as an extender or bridge towards electronic devices of a second set of electronic devices;
   (d) establishing a data communication connection between the wireless communication unit of said selected electronic device of the first set and the wireless communication units of electronic devices of the second set of electronic devices.

3. The method of claim 2, further comprising:
   (e) selecting one of the electronic devices of the second set, the wireless communication unit whereof to act as an extender or bridge towards electronic devices of a further set of electronic devices;
   (f) establishing a data communication connection between the wireless communication unit of the selected electronic device of the second set and the wireless communication units of electronic devices of the further set of electronic devices.

4. The method of claim 3, further comprising:
   (g) selecting one of the electronic devices of the further set, the wireless communication unit whereof to act as an extender or bridge towards electronic devices of a yet further set of electronic devices;
   (h) establishing a data communication connection between the wireless communication unit of the selected electronic device of the further set and the wireless communication units of electronic devices of the yet further set of electronic devices;
   (i) repeating steps (g) and (h) until all electronic devices are in direct or indirect data communication with the wireless network access point of the data collection unit.

5. The method of claim 1, wherein when an unconnected electronic device is found by a plurality of scanning electronic devices, selecting the scanning electronic device detecting a strongest signal from the unconnected electronic device to act as the extender or bridge towards the unconnected electronic device.

* * * * *